C. DRABEK.
COMBINED SPRING AND LEVER SUSPENSION FOR VEHICLES.
APPLICATION FILED MAY 25, 1916.

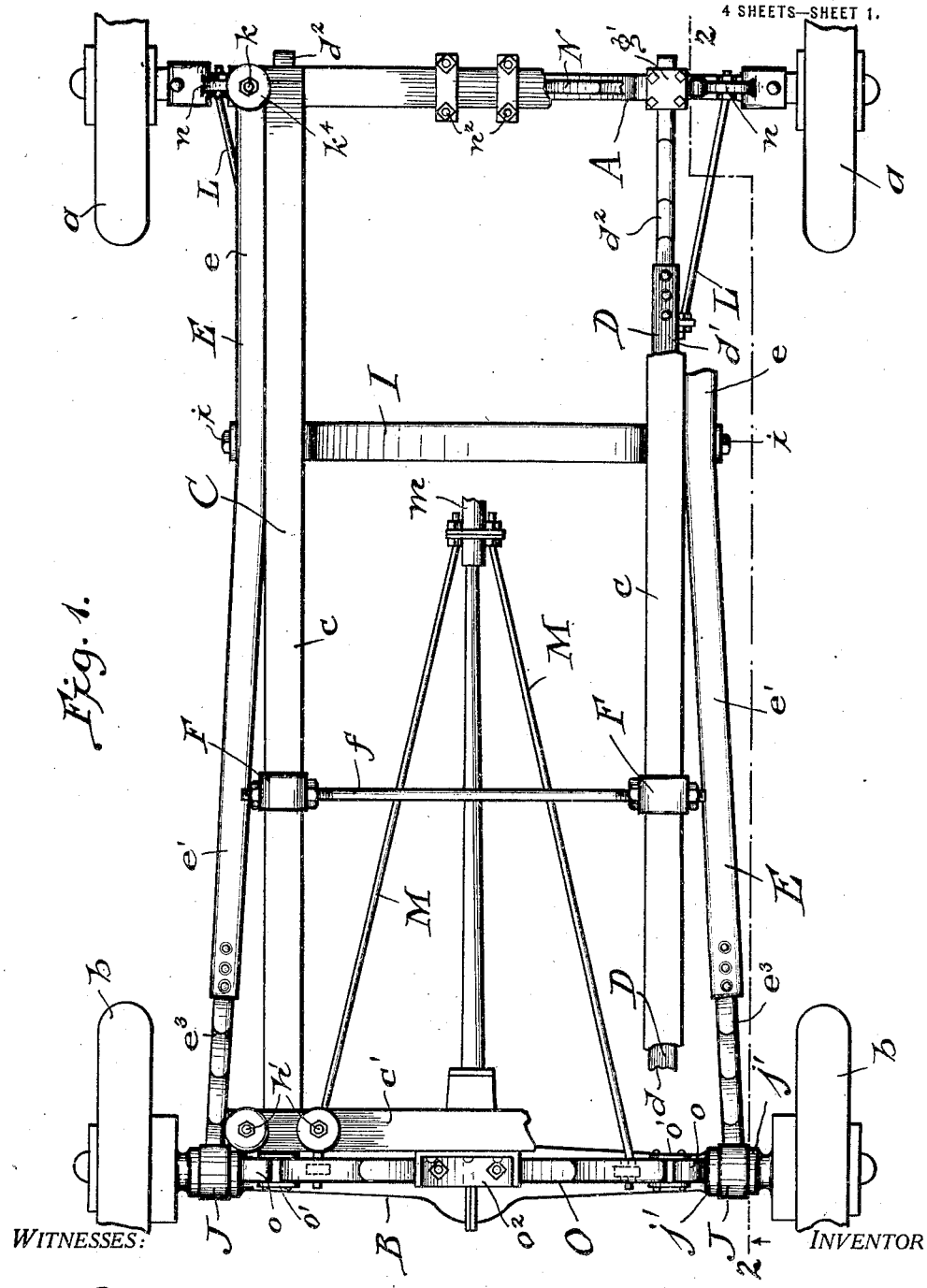

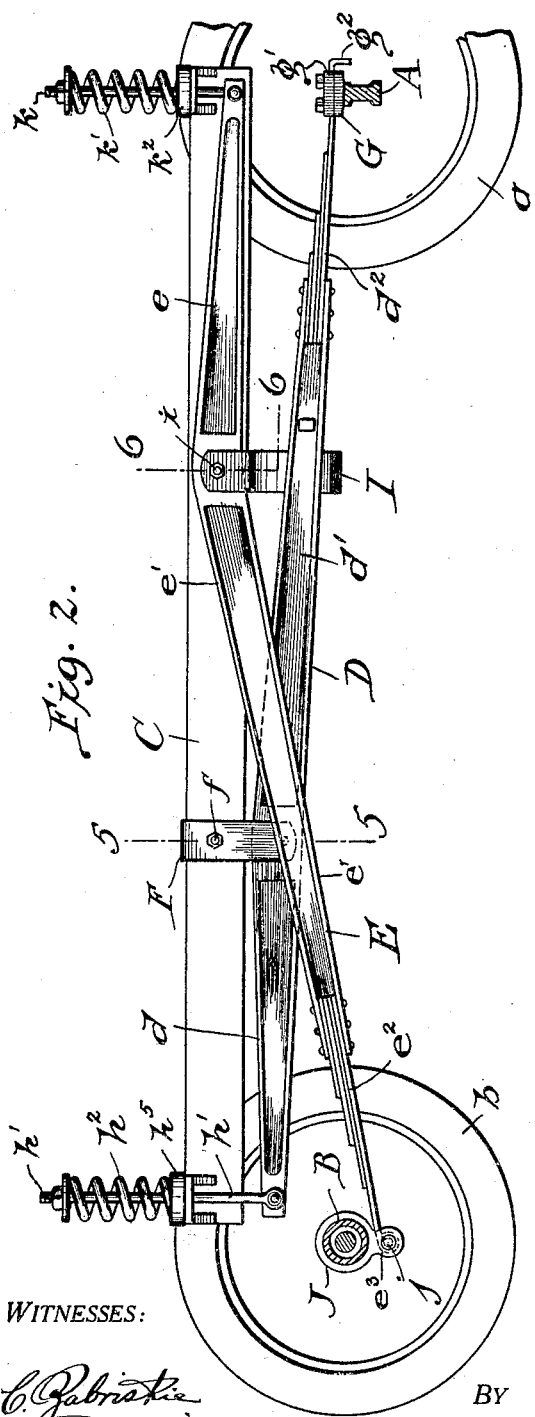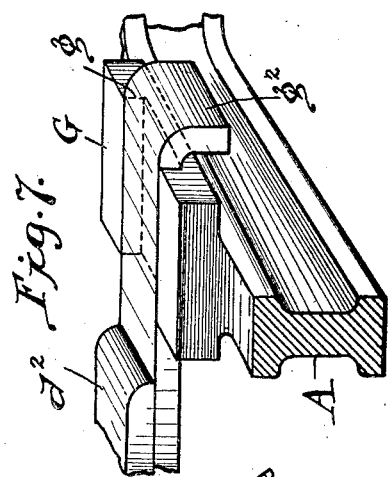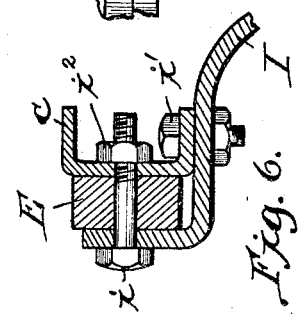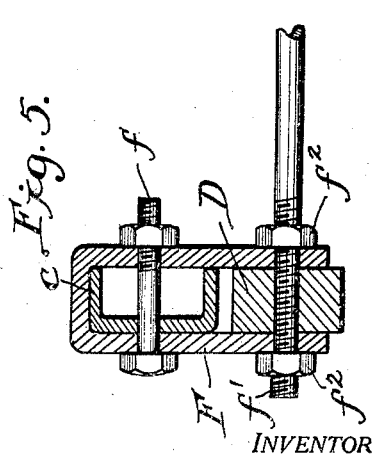

1,359,677.

Patented Nov. 23, 1920.

WITNESSES:

INVENTOR
Charles Drabek.
BY
Jas. H. Griffin
Attorneys

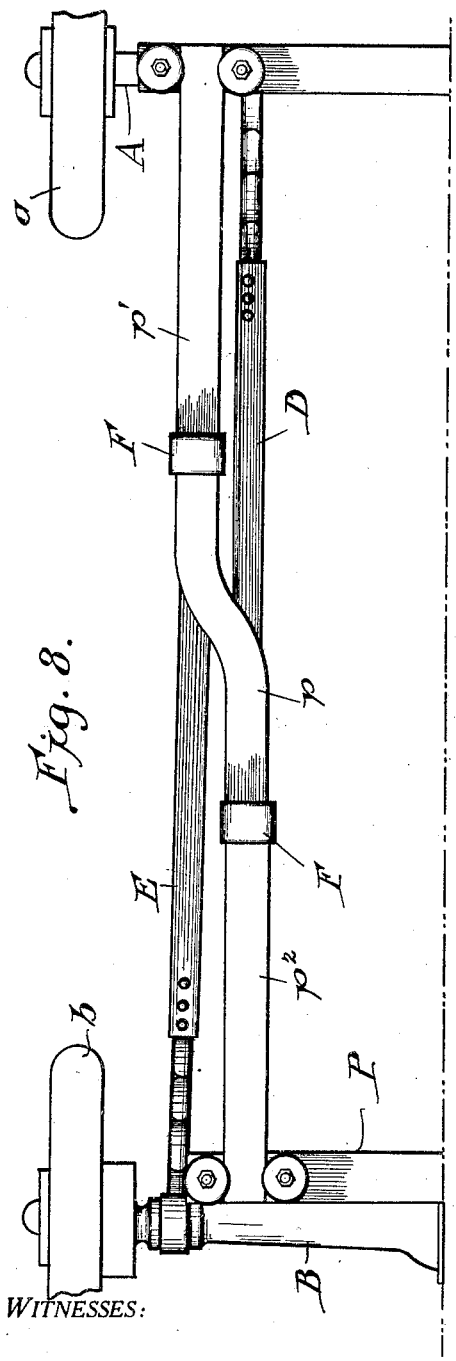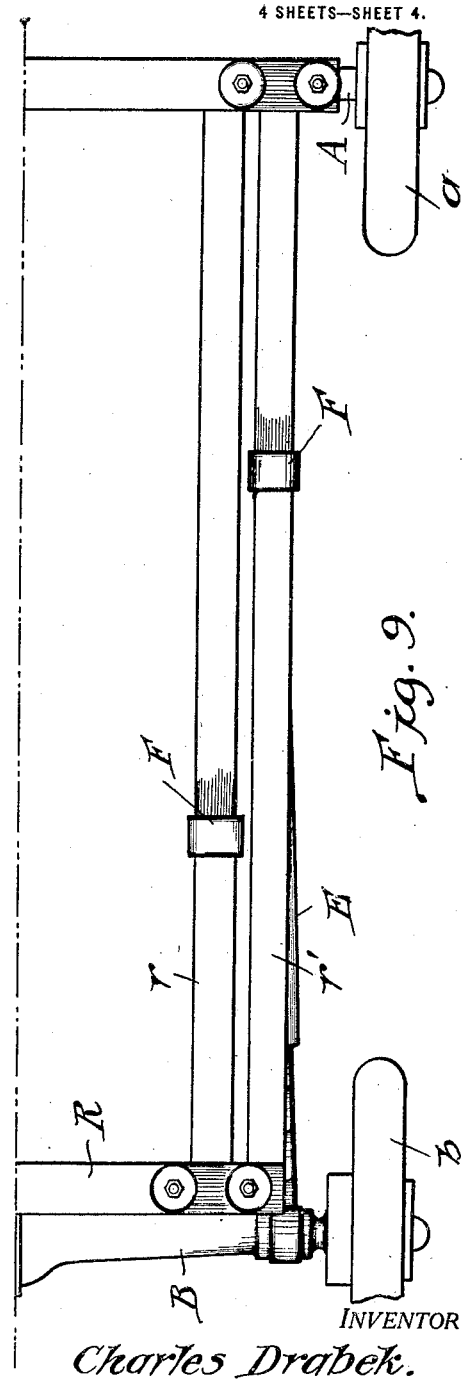

UNITED STATES PATENT OFFICE.

CHARLES DRABEK, OF CLEVELAND, OHIO.

COMBINED SPRING AND LEVER SUSPENSION FOR VEHICLES.

1,359,677.  Specification of Letters Patent.  Patented Nov. 23, 1920.

Application filed May 25, 1916. Serial No. 99,771.

*To all whom it may concern:*

Be it known that I, CHARLES DRABEK, a citizen of the United States, residing in the city of Cleveland, county of Cuyahoga, and State of Ohio, have invented a certain new and useful Combined Spring and Lever Suspension for Vehicles, of which the following is a specification.

This invention is a combined spring and lever suspension for vehicles and constitutes an improvement on my prior invention forming the subject matter of Patent No. 1,119,937, of December 8, 1914.

The object of the invention, speaking generally, is to provide a structure which will minimize the transmission of shocks and vibrations, resulting from irregularities or obstructions in the road-bed, to the body of the vehicle, and among the features of the invention by which this object is accomplished may be briefly enumerated, first, an arrangement of levers, preferably of the first class, which are pivoted to a load-carrying member, and which have resilient connections with said load-carrying member and with the axles of the vehicle; second, means for precluding lateral sway of the load-carrying member when the vehicle is passing over uneven roads; third, an improved manner of mounting the levers for pivotal movement on the load-carrying member, to obviate torsional strains on said member and secure maximum rigidity; fourth, an improved manner of securing the levers to the axles by non-rigid, resilient connections; fifth, an improved form of load-carrying member, by virtue of which all torsional strains are obviated, and, sixth, the combining in a vehicle chassis, of a plurality of the foregoing features, all of which coöperate with one another with such high degree of efficiency that the shocks or vibrations received by the vehicle axles are minimized in the load-carrying member, so that the vehicle rides smoothly and without jar.

Features of the invention, other than those specified, will be apparent from the hereinafter detailed description taken in conjunction with the accompanying drawings.

In the accompanying drawings I have illustrated different practical embodiments of the invention, but the constructions therein shown are to be understood as illustrative only, and not as defining the limits of the invention.

Figure 1 is a plan view of a chassis embodying the present invention, certain portions of the load-carrying member and coöperating levers being broken away, in the interest of clearness.

Fig. 2 is a vertical, longitudinal section taken on line 2—2 of Fig. 1.

Figure 3:
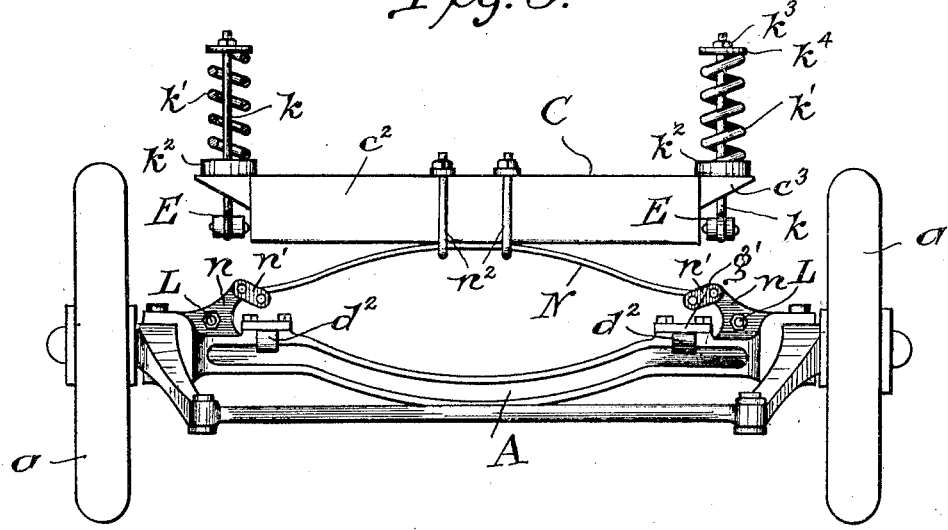
Fig. 3 is a front elevation of the chassis shown in Fig. 1.

Figs. 5 and 6 are transverse, detail sections taken on the lines 5—5 and 6—6, respectively, of Fig. 2.

Fig. 7 is a detail perspective of a certain sliding connection between the front axle and the spring to which one of the levers is connected.

Fig. 8 is a plan view illustrating one-half of a modified form of load-carrying member particularly applicable for employment with other features of this invention, and Fig. 9 is a like view of a further modified form of load-carrying member which may be employed to advantage.

Referring to the drawings, the running gear is shown as embodying a front axle A, supported by wheels $a$ and a rear axle B, supported by wheels $b$. Positioned in a plane above the axles is a rigid frame C, which constitutes the load-carrying member of the chassis. In the embodiment of the invention illustrated in Figs. 1 to 7, inclusive, load-carrying member C is shown in the form of a rectangular frame constructed from channel beams. The side reaches $c$ of the frame are maintained in parallel, spaced relation by transverse end members $c'$ $c^2$ positioned at the back and front, respectively, of the frame. In said figures the transverse members $c'$ $c^2$ protrude for a short distance beyond the lateral edges of the side reaches $c$, for reasons hereinafter manifest.

The load-carrying member C is supported above the axles, in operative relation thereto, by means of four suspension levers D and E, the levers D constituting a pair for supporting the frame from the front axle, while levers E constitute another pair for supporting the frame from the rear axle. Levers D, which are preferably of the first kind or class, are pivoted to load-carrying member C at points rearwardly of its center, as shown best in Figs. 1 and 2.

Any desired form of mounting may be employed, but in Fig. 5 is shown the one preferred. It consists in an inverted, substantially U-shaped, metallic strap F, one end of which extends over each side reach c of the frame and is secured to said reach by a bolt f. The ends of strap F depend below the lower edge of the reach and embrace one of the levers D. A bolt f' extends through the depending portions of strap F and through the lever D, and this bolt, which is locked against longitudinal movement by jam nuts $f^2$, serves as the fulcrum for the lever. Both levers D are thus pivoted beneath the frame and in the same vertical planes as the respective side reaches c with which they are associated. This constitutes an extremely rigid construction, since the strains incident to pivotal movement of the levers are received directly beneath the side reaches c, in the form of a direct, upward thrust, and not as torsional strains. Moreover, to assure still greater rigidity of the mounting, bolt f' preferably extends transversely of the load-carrying member C and forms a common fulcrum for both levers. Any torsional strains, therefore, incident to slight side play of the levers, are carried by bolt f', and, accordingly, the side reaches c are not subjected to such strains.

Each lever D is preferably so proportioned that it has arms of unequal length, the short arm d of which extends rearwardly of the load-carrying member to substantially the rear end thereof, while the long arm d' extends forwardly beneath its side reach c, and carries at its forward end a spring $d^2$ built up of a plurality of leaves of progressively increasing length, as shown in Fig. 2.

Mounted on the front axle, at each side thereof, is a seat G, provided with a slideway g, in which is adapted to rest the lower leaf of spring $d^2$, and a cover g' is adapted to be secured, by any suitable means, over seat G to house the spring within the slideway. The spring is thus precluded from vertical disengagement from slideway g by cover g', while it is precluded from pulling free from the slideway by the turned-down end of the spring as shown at $g^2$, Figs. 2, 3 and 7.

At the end of the short arm d of each lever D are laterally extending trunnions h, to the outer ends of which are pivoted upstanding posts h', which posts extend upwardly through apertures in the transverse end member c' of the load-carrying member and project beyond the upper edge thereof. Around each post h' is coiled a helical spring $h^2$, and superimposed upon said helical springs are washers $h^3$. The upper ends of posts h are threaded to receive nuts $h^4$, and, when these nuts are screwed into place, helical springs $h^2$ are placed under tension. To assure the centralizing of posts h' within springs $h^2$, each spring is preferably provided with a depressed seat $h^5$, mounted on the upper edge of transverse bar c', or formed integral therewith, and these seats maintain the springs at all times in co-axial relation with the posts whereby they serve to operate with maximum efficiency.

Levers E, like levers D, are of the first class, and each is pivoted forwardly of the center of the load-carrying member C to one of the side reaches c. The arms of each lever E are also of unequal length, the short arm e extending forwardly to substantially the front end of the load-carrying member, and the long arm e' extending rearwardly of said member.

In order that the levers D and E will not interfere with one another in their pivotal operations, each lever E is pivoted in a different vertical plane from the adjacent lever D, and, as the latter lever is positioned below, and in substantially the same vertical plane as, the side reach c, the lever E is positioned laterally of said side reach, and, in the form of the invention shown in Figs. 1 and 2, to the outside of lever D.

Like levers D, levers E may be pivoted to the load-carrying member in different ways, but, in the embodiment under consideration, they are shown as secured to the exterior faces of the side reaches c, in face-abutting relation. A detail of the mounting is shown in Fig. 6. It embodies a strap I, which extends transversely of the load-carrying member C and beneath the same, and is secured to the opposite side reaches c by means of bolts or rivets i'. Strap I extends beyond the outer face of the side reaches c, and is turned up at its opposite ends, as shown in Fig. 6. A bolt i is passed through an aperture in the turned-up portion of the strap and extends through the side reach c, being held in place by a nut $i^2$. Levers E lie intermediate the turned-up portion of strap I and the outer face of the side reaches of the load-carrying member, and bolts i pass through holes in said levers and form the fulcrum on which said levers are adapted for pivotal movement.

Strap I plays an important part in the mounting described, since, as it extends across and beneath the load-carrying member, it forms a transverse brace, the ends of which coöperate with the side reaches c, to support the levers. In the absence of this transverse brace, a load imposed upon levers E would have a tendency to bend bolts i and, at the same time, twist the side reaches c. However, when strap I is employed as described, it supports the outer ends of bolts i, precludes their bending, and obviates the twisting action of the levers upon the load-carrying member. For these reasons, the structure described is very strong and rigid, all twisting is precluded, and strap I, in addition, serves as a lateral brace for frame C.

It will be noted that the strap is shown as bent downwardly intermediate the side reaches $c$, this being done so that the strap will clear the engine and transmission, which generally are positioned at the forward part of a motor-driven vehicle.

The long arm $e'$ of each lever E extends downwardly from, and rearwardly of, the load-carrying member, and carries at its end a spring $e^2$ built up of a plurality of leaves, like springs $d^2$. The end of each spring $e^2$ terminates in an eyelet $e^3$ which embraces a pin $j$ mounted in a hanger J. A portion of each hanger J embraces the rear axle B and is adapted for pivotal movement thereon, but is precluded from movement longitudinally of the axle by means of two collars $j'$, one of which is fixed to the axle at either side of hanger J.

The short arm $e$ of each lever E extends forwardly from the pivot pin $i$, and has a post $k$ pivoted to the end thereof. Post $k$ extends upwardly through the laterally projecting portions $c^3$ of the front transverse member $c^2$ and beyond the upper face thereof. A helical spring $k'$ is coiled around post $k$ in a depressed pocket $k^2$, which maintains the spring in co-axial relation with the post. Like posts $h'$, the upper portions of posts $k$ are threaded to receive nuts $k^3$, which through intervening washers $k^4$, retain the springs $k'$ under tension.

From the foregoing, it will be manifest that, since springs $h^2$ are under tension, they operate to normally depress the rear portion of the load-carrying member C and to simultaneously elevate the short arms $d$ of levers D. Because of the pivotal connection between levers D and the load-carrying member, however, the reverse effect will be produced at the opposite ends of the levers. That is to say, the forward portion of the load-carrying member will be impelled upwardly, and the long arms $d'$ of levers D will be depressed. As arms $d'$ of the pair of levers D are secured to the front axle, the forces transmitted through the rigid levers and load-carrying member, as the result of the operation described, serve to elevate or support the forward portion of the load-carrying member. The pair of levers E and their coöperating springs operate in like manner to support the rear end of the load-carrying member.

Accordingly, shocks and vibrations received by the front axle will be dissipated by springs $d^2$ and levers D, but any shock or vibration which is transmitted to the load-carrying member from the front axle will be received at the rear portion of the load-carrying member, after being greatly minimized and practically dissipated. In like manner, shocks or vibrations received by the rear axle will, in very greatly lessened strength, be transmitted to the forward portion of the load-carrying member. Thus, the shocks at the front axle will not affect the forward portion of the load-carrying member, nor will the shocks at the rear axle affect the rear portion of the load-carrying member. The action of the two pairs of levers D and E, and their associated springs $d^2$ $h^2$ and $e^2$ $k'$ respectively, will be almost totally nullified, and the shocks or vibrations transmitted to the load-carrying member will be of such slight and feeble nature as to be inconsequential. This is largely due to the fact that two springs are associated with each lever. With each of the levers D, for example, is associated a built-up leaf spring $d^2$ which receives the shock first, while such amount of the shock which passes through spring $d^2$ is delivered to lever D greatly decimated. There is, naturally, some resiliency in lever D, because of its length, and this resiliency further decreases the effect of the shock. Finally, the shock, to affect the load-carrying member, must be transmitted through helical spring $h^2$. The whole construction is of a more or less resilient nature, and, in a structure of this kind, practically every part through which the shock must pass, in reaching the load-carrying member, operates to cushion, to a more or less degree, the effect of the shock.

It will, moreover, be manifest that, as the two pairs of levers D and E operate in different vertical planes, neither pair will interfere with the other pair in the carrying out of its functions. Moreover, according to the construction described, the load-carrying member may be slung comparatively low, which feature is now recognized as highly advantageous in automobile construction.

Another way in which vibrations or shocks are minimized is by the loose or non-rigid connections between the ends of the long arms of the levers and the respective axles. The connection with the front axle is shown as a sliding connection, while the connection with the rear axle is shown as a pivotal connection. Either of these connections is much superior to a rigid connection, since experience and experimentation have proved that the loose connections described operate, of themselves, to greatly cushion the structure against jars or shocks, whereas a rigid connection transmits the shocks with the same severity as that with which they are received.

In Fig. 1, I have shown levers D as having sliding connection with the front axle, and levers E as having pivotal connection with the rear axle. This construction is to be understood as illustrative, only, since, if desired, both pairs of levers might be pivotally connected to the two axles, or both might be slidably connected therewith. The connections illustrated are interchangeable and either may be used to the exclusion of the other, although both are highly practical and efficient.

Because of the loose or non-rigid connections described, means is provided for maintaining the parallel relation between the front and rear axles. In Fig. 1, the front axle is shown as maintained in perpendicular relation to the longitudinal medial line of the load-carrying member by means of a pair of torque rods L, secured at their forward ends to the front axle A, and at their rearward ends to the long arms $d'$ of levers D. Rods L are of rigid construction and are secured to the respective parts against longitudinal movement, so that the relation between the ends of the long arms $d'$ of levers D and the front axle is constant. Rear axle B is maintained in parallel relation to the front axle by means of two other torque rods M, the rear ends of which are secured to the rear axle, and the forward ends of which are, in the form shown, secured to the drive shaft, preferably at that point in its length whereat the universal joint $m$ is positioned. It will be understood, however, that torque rods M may be secured to levers E, which are associated with the rear axle, or, if desired, may coöperate directly with the load-carrying member. In any construction, however, rods M are secured at their opposite ends against longitudinal movement, and thus serve to maintain the rear axle in perpendicular relation to the longitudinal medial line of the load-carrying member.

The construction thus far described may be employed as a complete motor vehicle chassis, and, when so used, will operate with efficiency greatly in excess of that which has heretofore been obtained in structures of this general character. It has, however, been demonstrated that, in vehicles wherein a load-carrying member is supported upon levers, there is apt to be some side sway of the load-carrying member when the vehicle is passing over rough or uneven roads. This side sway, while unpleasant to the occupants of the vehicle, is, moreover, detrimental to the suspension levers, and particularly so at their fulcrumed points. It is, therefore, desirable to provide some means to preclude this lateral sway and thereby eliminate the disadvantages referred to, among which may be mentioned the bending of the pivot pin, which is so apt to occur if the side sway is excessive.

Figure 4:
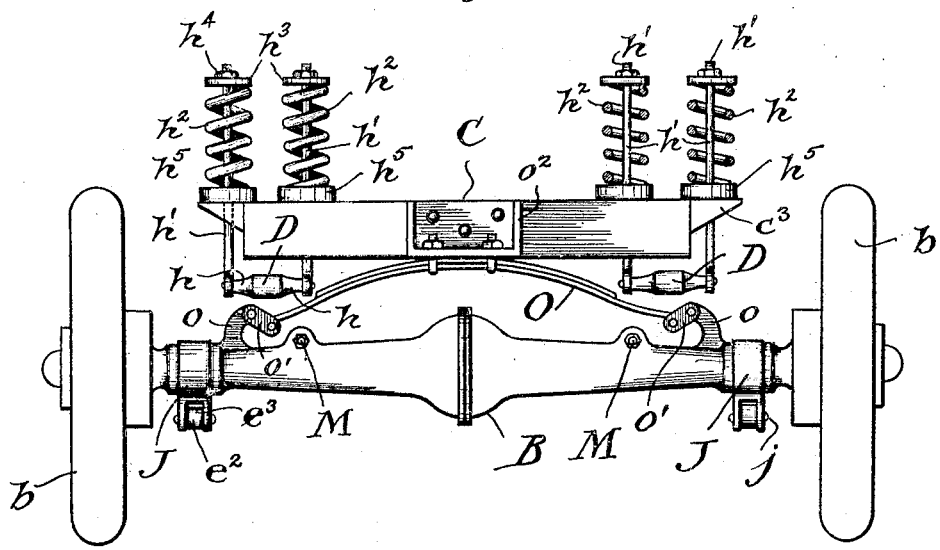
Fig. 4 is a rear elevation thereof.

In Figs. 3 and 4 is illustrated one practical method of eliminating side sway in a vehicle of this character. Upon front axle A of the vehicle are formed two upstanding brackets $n$, to which are secured the opposite ends of a leaf spring N, by means of shackles $n'$. Spring N is secured intermediate its ends to the transverse member $c^2$ of the load-carrying member C by any suitable means, such as the yokes $n^2$.

Spring N may be in the form of a single leaf, or may, if desired, embody a plurality of leaves. Because of its resilient qualities, said spring does not in the least interfere with the pivotal operations of the levers, but absolutely precludes the side sway of the front portion of the load-carrying member. Moreover, it has an additional function, namely, that usually performed by a spring, the cushioning of shocks and vibrations.

Rear axle B is similarly equipped with a spring O, secured by means of shackles $o'$ to upstanding brackets $o$ formed on the rear axle. In order that the short arms $d$ of levers D will have sufficient clearance, rear axle B is positioned a short distance rearwardly of the load-carrying member, and spring O is, accordingly, secured to the load-carrying member through the medium of a bracket or step $o^2$ fixed on the rear transverse member $c'$ of the load-carrying member, as shown more particularly in Figs. 1 and 4. Spring O thus operates in the same manner as spring N, to preclude side sway of the rear portion of the load-carrying member, so that, by the coöperative action of these two springs, such side sway and its inherent disadvantages are entirely obviated.

In the embodiment of the invention thus far described, two ways of mounting the suspension levers on the load-carrying member have been set forth. One way consists in supporting the lever directly beneath the side reaches $c$ of the load-carrying member, and the other way consists in supporting the suspension levers in face-abutting relation laterally of said side reaches. It will be apparent, to those skilled in the art, that the first mounting is by far the strongest and most rigid, and, accordingly, as rigidity and strength are pronounced desiderata in vehicle construction, I prefer, whenever possible, to employ the first-mentioned mounting, not only because of its strength, but because of the fact that the parts of the mounting may be made of lighter material and still afford adequate strength and rigidity. For these reasons, I have shown, in Figs. 8 and 9 of the drawings, modified forms of load-carrying member which allow of the supporting of both pairs of levers beneath the side reaches of the load-carrying member.

In Fig. 8, the load-carrying member P is shown as substantially rectangular in shape, but its opposite side reaches $p$ (only one of which is shown) are offset intermediate their ends, so that the rear portions of said side reaches are out of alinement with, or in a different vertical plane from, the forward portions thereof. This allows of the positioning of the forward portions of the pair of suspension levers E, which are associated with the rear axle, directly beneath the forward portions $p'$ of the side reach $p$, and the positioning of the rear portions of the pair of levers D beneath the rear portions $p^2$ of said side reach. The mounting F employed for both pairs of levers is the same as that shown in Fig. 5 of the drawings, but, in this embodiment of the invention, the bolt or rod $f'$ may or may not, as desired, extend from one side of the load-carrying member to the other, this being entirely optional.

In Fig. 9 of the drawings, the load-carrying member R is shown as formed with a pair of parallel side reaches $r$ and $r'$ positioned at each side of the medial line of said member. These parallel side reaches are spaced substantially the same distance apart as is equivalent to the offset of the side reach $p$ in the form of construction illustrated in Fig. 8, and the respective levers are mounted on the separate reaches $r$ and $r'$. That is to say, the pair of levers E are pivotally connected by mountings F to the side reaches $r'$, while the pair of levers D are pivoted by mountings F to the other side reach $r$. By this construction, the levers are pivoted directly beneath the side reaches with which they are associated, each side reach carrying one lever. In either of the constructions shown in Figs. 8 and 9, the resulting structure is extremely strong and durable, and lateral strains are insignificant.

A further advantage of the constructions of Figs. 8 and 9 resides in the fact that two helical springs may be employed to greater advantage at the short arms of both pairs of levers, than could be accomplished in the construction of Fig. 1. In Fig. 1, two helical springs are associated with the short arms of levers D, but only one helical spring is associated with the short arms of levers E. Manifestly, the duplex spring arrangement is of greater strength and efficiency, as one spring is positioned at either side of the vertical plane of the longitudinal reach of the load-carrying member with which the levers are associated, while, with the single spring, it is mounted at one side only of said reach. The duplex spring arrangement can, obviously, be carried out with increased efficiency in the constructions of Figs. 8 and 9, as the levers are positioned immediately beneath the side reaches of the load-carrying member, and a spring may thus be positioned at either side of said member, with their coöperating posts, which are secured to the short arms of the levers, extending downwardly on either side of the side reach. The forces of the two springs so associated are balanced in their effect upon the reach of the load-carrying member and are not conducive to torsional stresses, as is the case with a single spring. Accordingly, while the single spring operates with great efficiency, the duplex arrangement is, manifestly, superior, particularly when the vehicle is of a heavy character, or is adapted to transport heavy weights.

Having thus fully described the invention, what I claim as new, and desire to secure by Letters Patent, is:

1. In a vehicle, the combination of a load carrying member, a front axle, a rear axle, a pair of levers of the first class, having arms of unequal length, fulcrumed to the load carrying member with the long arms of the levers extending from their fulcrums to the front axle and secured thereto, resilient means coöperating with the short arms and the load carrying member, a similar pair of levers directly fulcrumed to the load carrying member, the long arms of said levers extending from their fulcrums to the rear axle and secured thereto, resilient means coöperating with the short arms of said pair of levers and the load carrying member, and resilient means independent of the levers and coöperating directly with the axles and the load carrying member for precluding side sway of said member.

2. A vehicle embodying a load carrying member, a front axle, a rear axle, a pair of levers of the first class, having arms of unequal length, pivoted to the load carrying member rearwardly of the center thereof, the long arms of the levers extending forwardly of the load carrying member and having resilient, non-rigid connections with the front axle, and resilient means coöperating with the short arms of said levers and the load carrying member, in combination with a second pair of levers of the first class, having arms of unequal length, pivoted to the load carrying member forwardly of the center thereof, the long arms of said levers extending rearwardly of the load carrying member and having resilient, non-rigid connections with the rear axle, and resilient means associated with the short arms of said levers and coöperating with the load carrying member.

3. A vehicle embodying a load carrying member, a front axle, a rear axle, a pair of levers of the first class, having arms of unequal length, pivoted to the load carrying member, the long arms of the levers extending forwardly of the load carrying member and having resilient, non-rigid connections with the front axle, and resilient means coöperating with the short arms of said levers and the load carrying member, in combination with a second pair of levers of the first class, having arms of unequal length, pivoted to the load carrying member between the points of pivoting of the first pair of levers and the front of the load carrying member, the long arms of said second pair of levers extending rearwardly of the load carrying member and having resilient, non-rigid connections with the rear axle, and resilient means associated with the short arms of said levers and coöperating with the load carrying member.

4. A vehicle embodying a load carrying member, a front axle, a rear axle, a pair of levers of the first class, having arms of unequal length, pivoted to the load carrying member, the long arms of the levers extending forwardly of the load carrying member and having resilient, non-rigid connections with the front axle, and resilient means pivotally secured to the short arms of said levers and coöperating with the load carrying member, in combination with a second pair of levers of the first class, having arms of unequal length, pivoted to the load carrying member between the points of pivoting of the first pair of levers and the front of the load carrying member, the long arms of said second pair of levers extending rearwardly of the load carrying member and having resilient, non-rigid connections with the rear axle, and resilient means pivotally secured to the short arms of said levers and coöperating with the load carrying member.

5. A vehicle embodying a load carrying member, a front axle, a rear axle, a pair of levers of the first class, having arms of unequal length, pivoted to the load carrying member with the long arms of said levers extending forwardly of the load carrying member, and leaf springs fixed to and extending beyond the ends of the long arms of said levers and having non-rigid connections with the front axle, in combination with a second pair of levers of the first class, having arms of unequal length, pivoted to the load carrying member between the points of pivoting of the first pair of levers and the forward edge of said load carrying member, the long arms of said levers extending rearwardly of the load carrying member, leaf springs secured to and extending beyond the ends of said long arms and having non-rigid connections with the rear axle, and resilient means associated with the short arms of each pair of levers and coöperating with the load carrying member.

6. A vehicle embodying a load carrying member, a front axle, a rear axle, a pair of levers of the first class, having arms of unequal length, pivoted to the load carrying member with the long arms of said levers extending forwardly of the load carrying member, leaf springs fixed to and extending beyond the ends of the long arms of said levers and having non-rigid connections with the front axle, and means for maintaining the front axle in perpendicular relation to the longitudinal medial line of the load carrying member, in combination with a second pair of levers of the first class, having arms of unequal length, pivoted to the load carrying member between the points of pivoting of the first pair of levers and the forward edge of said load carrying member, the long arms of said levers extending rearwardly of the load carrying member, leaf springs secured to and extending beyond the ends of said long arms and having non-rigid connections with the rear axle, means for maintaining the rear axle in perpendicular relation to the longitudinal medial line of the load carrying member, and resilient means associated with the short arms of each pair of levers and coöperating with the load carrying member.

7. In a vehicle, the combination of a load carrying member, a front axle, a rear axle, a pair of levers of the first class, having arms of unequal length, fulcrumed to the load carrying member with the long arms of the levers extending from their fulcrums to the front axle and secured thereto, resilient means coöperating with the short arms of levers, positioned above said arms, and the load carrying member, a similar pair of levers also fulcrumed to the load carrying member, the long arms of said levers extending from their fulcrums to the rear axle and secured thereto, resilient means coöperating with the short arms of said pair of levers and the load carrying member, and springs extending transversely of the load carrying member and coöperating directly with the axles and the load carrying member for precluding side sway of said member.

8. A supporting unit for a weight sustaining vehicle member embodying a lever of the first class mounted for pivotal movement on, and beneath, the weight sustaining member, said lever having arms of unequal length, to the end of the longer of which is affixed a spring adapted to be secured to an axle of the vehicle and to the shorter of which arms is pivoted resilient means coöperating with the weight sustaining member.

9. In a vehicle, the combination of a load carrying member embodying a plurality of side bars and transverse means for securing the side bars in rigid spaced relation, a front axle, a rear axle, and a plurality of levers for supporting the load carrying member on the axles, one of said levers being of the first class and having arms of unequal length, a hanger secured to one of said bars for fulcruming said lever beneath, and in substantially the same vertical plane as, said bar, resilient means associated with the long arm of said lever and non-rigidly secured to one of the axles, and resilient means pivotally mounted on the short arm of said lever and coöperating with the load carrying member.

10. A vehicle embodying a load carrying member constructed from a plurality of longitudinal bars and transverse spacing bars, the longitudinal bars being bent intermediate their ends so that the rear portion of the load carrying member is of different width from the front portion thereof, a front axle, a rear axle, a pair of levers of the first class pivotally mounted on and directly beneath the rear portion of the longitudinal bars of the load carrying member with the long arms extending forwardly of said member and having resilient, non-rigid connections with the front axle, a second pair of levers of the first class, having arms of unequal length, pivoted to and directly beneath the forward portions of the longitudinal bars of the load carrying member with their long arms extending rearwardly of said member and having resilient, non-rigid connections with the rear axle, and resilient means associated with the short arms of each lever and coöperating with the load carrying member.

11. In a vehicle, the combination of a load carrying member, a front axle, levers pivoted to said load carrying member and secured to the front axle, a rear axle, levers pivoted to the load carrying member and non-rigidly connected to the rear axle, said levers serving to support the load carrying member above the axles, and means, independent of the levers, for precluding side sway of the load carrying member.

12. In a vehicle, the combination of a load carrying member, a front axle, levers pivoted to said load carrying member and non-rigidly connected to the front axle, a rear axle, levers pivoted to the load carrying member and secured to the rear axle, said levers serving to support the load carrying member above the axles, and means, independent of the levers, mounted on the load carrying member and coöperating with the axles for precluding side sway of the load carrying member.

13. In a vehicle, the combination of a load carrying member, a front axle, levers pivoted to said load carrying member and secured to the front axle, a rear axle, levers pivoted to the load carrying member and non-rigidly connected to the rear axle, said levers serving to support the load carrying member above the axles, and a spring secured to the load carrying member and to one of the axles for precluding side sway of the load carrying member.

14. A vehicle embodying a load carrying member, a front axle, a rear axle, a pair of levers of the first class, having arms of unequal length, pivoted to the load carrying member and in substantial vertical alinement with the sides thereof, the long arms of the levers extending forwardly of the load carrying member and connected with the front axle, upstanding posts secured to the ends of the short arms of said levers, extending upwardly through the load carrying member, and provided at their upper ends with enlarged portions, springs coiled about said posts intermediate the load carrying member and the enlarged portions of the posts, and means for varying the tension of said springs, in combination with a second pair of levers of the first class, having arms of unequal length, pivoted to the load carrying member between the points of pivoting of the first pair of levers and the front of the load carrying member and in substantial vertical alinement with the sides thereof, the long arms of said second pair of levers extending rearwardly of the load carrying member and connected with the rear axle, upstanding posts associated with the free ends of the short arms of said levers and extending upwardly through the load carrying member, enlarged portions near the free ends of said posts, springs coiled about said posts intermediate the load carrying member and the enlarged portions of the posts, and means for varying the tension of said springs.

15. A vehicle embodying a load carrying member, a front axle, a rear axle, a pair of levers of the first class, having arms of unequal length, pivoted to the load carrying member, the long arms of the levers extending forwardly of the load carrying member and connected with the front axle, a plurality of upstanding posts associated with the free end of each of the short arms of said levers, extending upwardly through the load carrying member, and provided at their upper ends with enlarged portions, springs coiled about said posts intermediate the load carrying member and the enlarged portions of the posts, and means for regulating the tension of said springs, in combination with a second pair of levers of the first class, having arms of unequal length, pivoted to the load carrying member between the points of pivoting of the first pair of levers and the front of the load carrying member, the long arms of said second pair of levers extending rearwardly of the load carrying member and connected with the rear axle, a plurality of upstanding posts associated with the free end of each of the short arms of said levers and extending upwardly through the load carrying member, enlarged portions near the free ends of said posts, springs coiled about said posts intermediate the load carrying member and the enlarged portions of the posts, and means for regulating the tension of said springs.

16. In a vehicle, a load carrying member, a front axle, a rear axle, a pair of levers pivoted to the load carrying member and connected with the front axle, upstanding posts on said levers extending through and above the load carrying member, in substantial vertical alinement with one of the sides thereof and provided at their free ends with enlarged portions, springs coiled about the posts intermediate the load carrying member and the enlarged portions, and means for regulating the tension of said springs, in combination with a second pair of levers pivoted to the load carrying member and connected with the rear axle, upstanding posts on said levers extending through and beyond the load carrying member, in substantial vertical alinement with one of the sides thereof, and provided at their free ends with enlarged portions, springs intermediate the load carrying member and the enlarged portions of said posts, and means for regulating the tension of said springs.

17. In a vehicle, a load carrying member, a front axle, a rear axle, a pair of levers pivoted to the load carrying member and connected with the front axle, a plurality of upstanding posts on each of said levers extending through and above the load carrying member and provided at their free ends with enlarged portions, springs coiled about the posts intermediate the load carrying member and the enlarged portions, and means for varying the tension on said springs, in combination with a second pair of levers pivoted to the load carrying member and connected with the rear axle, a plurality of upstanding posts on each of said levers extending through and beyond the load carrying member and provided at their free ends with enlarged portions, springs intermediate the load carrying member and the enlarged portions of said posts, and means for varying the tension of said springs.

18. A vehicle embodying a load carrying member, a front axle, a rear axle, a pair of levers of the first class extending substantially the entire length of the load carrying member and pivoted intermediate their length to said member, a pair of hangers pivotally mounted on the rear axle, pivotal connections between one arm of each of said levers and one of said hangers, and resilient connections between the other arms of said levers and the load carrying member, in combination with a second pair of levers substantially equal in length to the length of the load carrying member and pivoted intermediate their ends to said member, one arm of each of said second pair of levers being connected with the front axle, and the other arms of said levers being resiliently connected with the load carrying member.

19. In a vehicle, a load carrying member embodying a plurality of longitudinal bars, means for maintaining said bars in spaced relation, each longitudinal bar being bent intermediate its ends so that the rear portion of the load carrying member is of different width from the front portion thereof, a front axle, a rear axle, and a plurality of levers pivotally mounted on the side bars and resiliently secured thereto and to the axles, the point of pivoting of each lever being directly beneath, and in vertical alinement with, its corresponding side bar.

In testimony whereof I have signed my name to this specification.

CHARLES DRABEK.